Nov. 14, 1933.　　　　A. KÜHL　　　　1,934,863

GALILEAN TELESCOPE

Filed May 17, 1928

August Kühl
INVENTOR by Otto Munk
his ATTY.

Patented Nov. 14, 1933

1,934,863

UNITED STATES PATENT OFFICE 1,934,863

GALILEAN TELESCOPE

August Kühl, Munich, Germany, assignor to the firm Optische Werke G. Rodenstock, Munich, Germany Application May 17, 1928, Serial No. 278,600, and in Germany April 4, 1925

1 Claim. (Cl. 88—57)

My invention relates to simple Galilean telescopes.

Galilean telescopes are of two main types, viz, simple and composite. The simple Galilean telescope contains but a single positive lens in the objective, which lens usually consists of an ordinary crown and flint glass cemented together, and a single negative lens of ordinary crown glass in the ocular; the composite Galilean telescope has one or more groups of lenses in the objective or in the ocular or in both. The composite Galilean telescope has very substantial corrective powers but is practically useless because its cost of manufacture is virtually prohibitive.

The object of the present invention is to improve the simple type of Galilean telescope and I attain this object by making the objective in known manner of ordinary crown and flint glass while making the ocular of heavy crown glass instead of ordinary crown glass, as it was done heretofore. Heavy crown glass, as generally understood and also herein intended to mean, designates crown glass of a refractive index above 1.57 and a dispersion number ranging between 54 to 62. The form of the lens is such that the spherical longitudinal aberration is less than 0.15 D, the astigmatism of oblique pencils is less than 0.25 D, the chromatic difference in the axis is less than 0.20 D and the chromatic magnifying difference is less than 1.5 arc minutes, i. e., that all these defects are not perceptible to the normal human eye and that the distortion is less than 2%.

The formation is such that the refractive powers of the front surfaces of the objective and ocular are more than twice the refractive power of the objective.

It will, of course, be understood that the present invention does not of itself alone relate merely to an ocular lens of heavy crown glass but very especially to a simple Galilean system which, as is well known, constitutes an inseparable entity.

Figure 1:
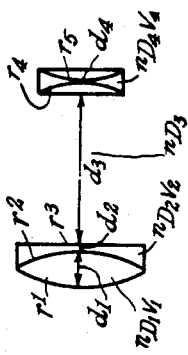

The invention is illustrated in the accompanying drawing in which Fig. 1 shows a Galilean telescope or lens according to the present invention, having a two and one-half times magnifying power and Figs. 2 to 5 show the corrections obtained thereby.

The data in Fig. 1 are the following:—

Figure 2:
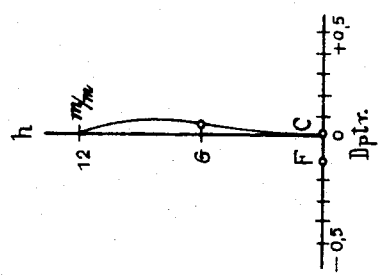

$r_1$+ 33.5 mm
$r_2$— 33.5 mm
$r_3$—136.0 mm
$r_4$— 29.5 mm
$r_5$+ 29.5 mm $d_1$ 6 mm_____$n_D$ 1 1.52_____Crown
$d_2$ 1 mm_____$n_D$ 2 1.62_____Flint
$d_3$ 31.6 mm_____$n_D$ 3 1 (air)
$d_4$ 1 mm_____$n_D$ 4 1.61_____Heavy crown Fig. 2 shows this spherical aberration in dependence on the height of incidence ($h$) of the incoming ray. It will be noted that its greatest value for the height of incidence $h=8m$ is less than 0.1 Dptr. On the abscisses of Fig. 2 is also shown the chromatic deviation in the axis:—zero corresponds to the focal point for the Frauenhofer line D (yellow), the point C corresponds to the focal point for the Frauenhofer line C (red) and the point F corresponds to the focal point for the Frauenhofer line F (green). The position of the three points shows that the chromatic deviation in the axis is less than 0.15 Dptr.

Figure 3:
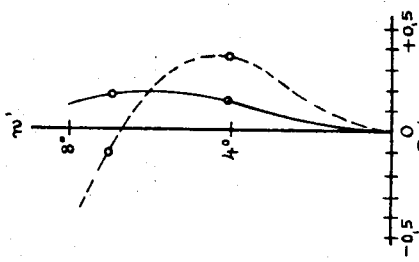

Fig. 3 shows the course of the astigmatism for the tangential (dotted curve) and sagittal (full line curve) rays in dependence on the main ray inclination $w'$. It will be apparent that the greatest amount of astigmatism at about .4° inclination is less than 0.25 Dptr.

Figure 4:
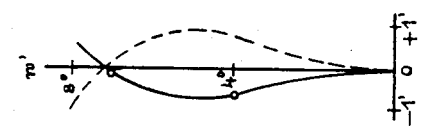

Fig. 4 shows the course of the chromatic magnifying difference dependent on the main ray inclination $w'$. The ordinate axis corresponds to the Frauenhofer line D, the full line curve gives the position of the Frauenhofer line F and the dotted line curve the position of the line C. It will be apparent that the greatest amount of the chromatic magnifying difference at about .5° inclination is less than one arc minute.

Figure 5:
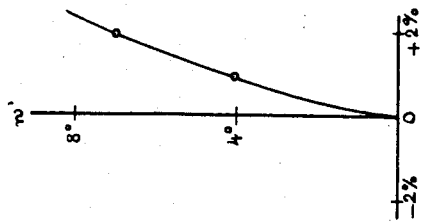

Fig. 5 shows the course of the distortion dependent on the main ray inclination $w'$ and indicates that up to 8° inclination the indications are less than 2%.

I claim:—

In a simple Galilean telescope, the combination of a positive objective consisting of an ordinary crown glass and a flint glass cemented together, and a negative ocular consisting of crown glass having a refractive index above 1.57 and a dispersion number ranging between 55 and 62; the said positive and negative lenses being so curved that the absolute refractive powers of the front surfaces are less than 2.2 as great as the refractive power of the objective.

AUGUST KÜHL.